No. 852,068. PATENTED APR. 30, 1907.
C. G. & A. G. LAMBERT.
APPARATUS FOR THE COMBINED VENTILATION AND MOISTENING OF WORKSHOPS.
APPLICATION FILED JAN. 17, 1907.
2 SHEETS—SHEET 1.
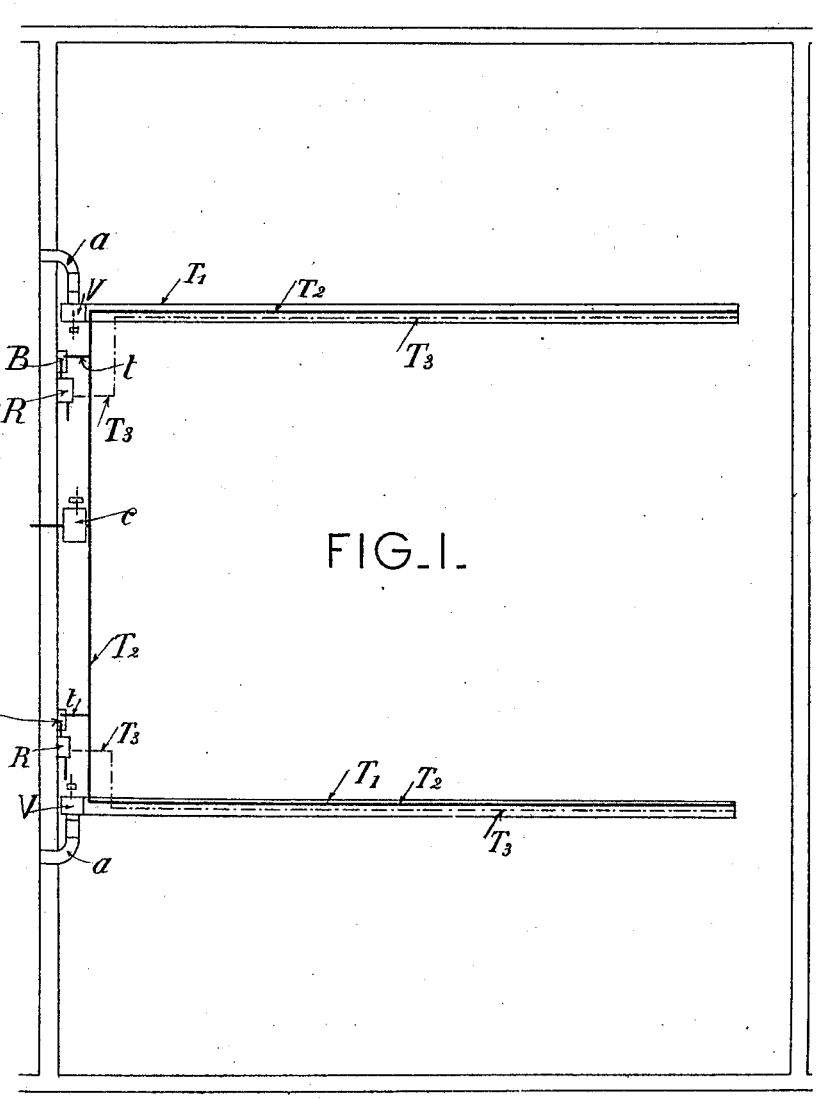
WITNESSES
W. P. Burke
M. Petit
INVENTORS
Charles Gustave Lambert
Alphonse Georges Lambert No. 852,068. PATENTED APR. 30, 1907.
C. G. & A. G. LAMBERT.
APPARATUS FOR THE COMBINED VENTILATION AND MOISTENING OF WORKSHOPS.
APPLICATION FILED JAN. 17, 1907.
2 SHEETS—SHEET 2.
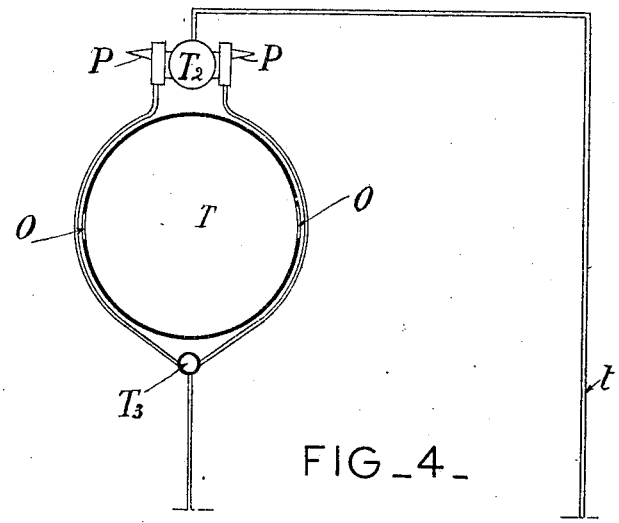
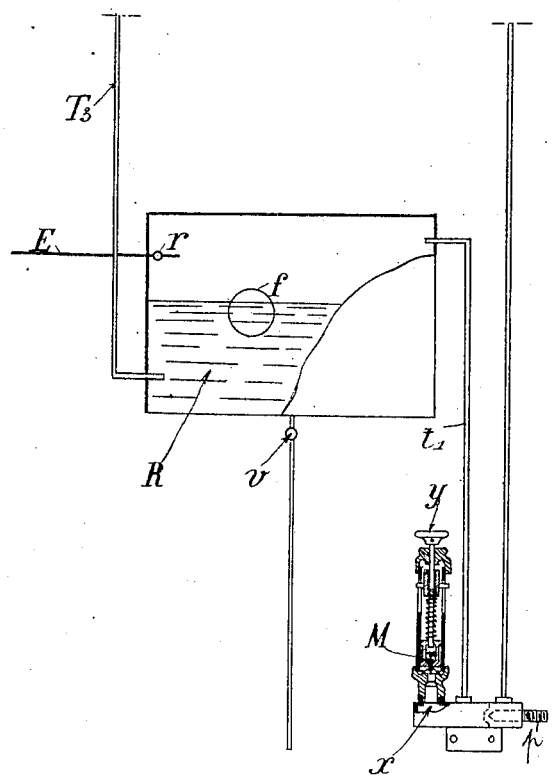
FIG_4_
WITNESSES
W. P. Burk
INVENTORS
Charles Gustave Lambert
Alphonse Georges Lambert
By ATTY.

UNITED STATES PATENT OFFICE.

CHARLES GUSTAVE LAMBERT AND ALPHONSE GEORGES LAMBERT, OF LEVALLOIS, FRANCE.

APPARATUS FOR THE COMBINED VENTILATION AND MOISTENING OF WORKSHOPS.

No. 852,068.      Specification of Letters Patent.      Patented April 30, 1907.

Application filed January 17, 1907. Serial No. 352,777.

*To all whom it may concern:*

Be it known that we, CHARLES GUSTAVE LAMBERT and ALPHONSE GEORGES LAMBERT, civil engineers, citizens of France, residing at 32 Rue Kléber, Levallois, Seine, France, have invented new and useful Improvements in Apparatus for the Combined Ventilation and Moistening of Workshops and other Premises, of which the following is a specification.

The object of this invention is to provide a system of combined ventilation and moistening for textile and other work-shops in which the room itself is utilized as a preparing chamber, all the water to be evaporated being distributed in the upper section of the room so as to form a substantially horizontal sheet of pulverized water or spray distributed over all the area of the room, all the amount of air required for ventilation being at the same time distributed at about the same height to form a sheet of air adjacent to the sheet of pulverized water, in such a manner as to make the two sheets flow together over the room, from top to bottom, each drop of water being thus surrounded by the total amount of air that it is to moisten. The plant is completed by a special regulating system which, by merely acting on a handle or button, allows the amount of spray brought into the room to be modified, and consequently the moistening to be controlled. With such an arrangement, the hygrometrical degree can always be controlled, whatever may be the circumstances arising from the outside temperature and the heat evolved from the interior, which is not the case with the various known systems.

The accompanying drawing illustrates a diagram of a plant according to the present invention.

Figure 1 is a plan view of a work-shop with two groups of apparatus for ventilation. Fig. 2 is a cross-section in projection of Fig. 1. Fig. 3 is a longitudinal section. Fig. 4 is a detail view on a larger scale, showing the details of the pipes and of the regulator.

The plant consists substantially in one or more series of pipes connected three by three; the number of these series will depend on the width of the room. Each series consists of three pipes laid parallel one above the other and extending from one end of the room to the other: the large sized pipe T' is the air forcing conduit adapted to distribute said air in the room through openings O arranged on each side of such conduit and at large intervals; the ventilating air brought in from the outside by the conduit $a$ is forced in the pipe T' by the ventilator V.

The pipe $T^2$ arranged above T' (see Figs. 3 and 4) is the compressed air supply conduit for the atomizers P, distributed in suitable numbers on each side of such conduit; the compressed air required for the spraying is distributed, in the example illustrated in the drawing, to two pipes $T^2$ by a single compressor C.

The pipe $T^3$ arranged under T' (see Figs. 3 and 4) is the water supply conduit for the atomizers P.

R is a tank which, in combination with the regulator proper, is used for controlling the moistening. Said tank is completely closed, and receives water from any source through pipe E, on which is fitted a cock $r$ connected to the float $f$, for keeping a constant level in such tank. The tank is further fitted with a discharge cock $v$ and is connected with atomizers by pipe $T^3$ and with regulator by pipe $t'$.

If the ventilators and the compressor are started, the fresh air flows out by openings O and forms a wide and substantially horizontal sheet on each side of the pipe T'. The compressed air flowing from the compressor issues through the atomizers P, producing the required suction for exhausting water from pipe $T^3$ and projecting such water outside into spray, forming a sheet adjacent to the sheet of air and placed a little above it; the drops of spray when falling in the room being thus surrounded or inclosed by the injected air they are to moisten.

The amount of water carried along and sprayed depends on the difference of height existing between the water-level in the suction pipe and the level of the atomizers. The regulator acts by modifying this height, viz. by controlling the level of the water in the suction pipe in the following manner. It comprises first a chamber $x$ connected with the compressed air conduit through pipe $t$ and a pin-valve $p$; as there are generally several regulators in a plant, and as these are more or less distant from the compressor, if the various pin-valves $p$ are more or less closed, on initial adjustment, a uniform pressure may be obtained in all chambers $x$, though the pressure may not be quite the same, owing to the falling-off of the supply, in the different conduits $t$. The chamber $x$ is connected by pipe $t'$ to the corresponding tank R, which is hermetically closed, so that the pressure being the same in all tanks R, the water is forced to the same height in all the suction pipes connecting these tanks to the atomizers. The regulator further comprises a valve-box fitted on the chamber $x$ and in which is provided a valve M which discharges to the outside and by opening said valve more or less, a certain quantity of compressed air from the chamber $x$ is allowed to escape to the outside, thus allowing the pressure in chamber $x$ to be controlled and consequently that in the corresponding tank R.

The valve M is caused to bear on its seat by weighting it with a fixed load and by the resilience of a spring. If the resilience of said spring is modified by operating the handle or button $y$, the resistance afforded by the valve is modified, so that any pressure desired may be maintained in the tank, the valve M opening when the air pressure exceeds the limit that has been fixed.

Each valve-box is provided with a graduated scale on which an index moves when the handle or hand-wheel $y$ is operated; the pressure being the same in all the chambers $x$, on account of the pin-valves $p$, the same scale may be adapted to all the valve-boxes, so that in order to effect the same change of level in all the suction pipes leading from the tanks to the atomizers, it will merely be necessary, by means of the handles $y$, to bring the indexes opposite the same graduated division in all the regulators. The degree of moistening for the entire room will thus be readily modified.

The special system above described may be applied to the controlling of the moistening of a room, either in plants comprising both moistening and ventilation simultaneously, or in plants for moistening alone.

Having now described our invention, what we claim as new and desire to secure by Letters Patent is:

1. A system of combined ventilation and moistening for work-shops and the like, comprising a large sized pipe $T'$ extending from one end of the room to the other and through which air from outside is caused to pass, a fan blower V adapted to force the air through pipe $T'$, openings O arranged on each side of said pipe $T'$ at large intervals, a pipe $T^2$ arranged above the large pipe $T'$ and parallel therewith adapted to receive a supply of compressed air, atomizers P distributed in suitable numbers on each side of said pipe $T^2$, a compressor C adapted to supply with compressed air all the atomizers, and a pipe $T^3$ arranged under the large pipe $T'$ and adapted to be supplied with water for the atomizers P, substantially as described and for the purpose set forth.

2. A system of combined ventilation and moistening for work-shops and the like, comprising a large sized pipe $T'$ extending from one end of the room to the other and through which air from outside is caused to pass, a fan blower V adapted to force the air through pipe $T'$, openings O arranged on each side of said pipe $T'$ at large intervals, a pipe $T^2$ arranged above the large pipe $T'$ and parallel therewith adapted to receive a supply of compressed air, atomizers P distributed in suitable numbers on each side of said pipe $T^2$, a compressor C adapted to supply with compressed air all the atomizers, a pipe $T^3$ arranged under the large pipe $T'$ and adapted to be supplied with water for the atomizers P, a constant level water tank R supplying the pipe $T^3$ with water, and regulating means adapted to control the quantity of water supplied from the tank to the pipe $T^3$ and consequently the moistening of the work-shop, substantially as described and for the purpose set forth.

3. A system of combined ventilation and moistening for work-shops and the like, comprising a large sized pipe $T'$ extending from one end of the room to the other and through which air from outside is caused to pass, a fan blower V adapted to force the air through pipe $T'$, openings O arranged on each side of said pipe $T'$ at large intervals, a pipe $T^2$ arranged above the large pipe $T'$ and parallel therewith adapted to receive a supply of compressed air, atomizers P distributed in suitable numbers on each side of said pipe $T^2$, a compressor C adapted to supply with compressed air all the atomizers, a pipe $T^3$ arranged under the large pipe $T'$ and adapted to be supplied with water for the atomizers P, a constant level water tank R supplying the pipe $T^3$ with water, a chamber $x$ connected with the compressed air pipe, a pin-valve $p$ fitted on said chamber and adapted to maintain a uniform pressure therein, a pipe $t'$ connecting the chamber $x$ to the tank R, a pipe $t$ connecting the chamber $x$ to the atomizers, a valve box fitted on the chamber $x$, and a valve M arranged within the valve box and adapted to control the pressure in the chamber $x$ and consequently the moistening of the work-shop, substantially as described and for the purpose set forth.

In testimony whereof we have signed our names to this specification in the presence of two subscribing witnesses.

CHARLES GUSTAVE LAMBERT.
   ALPHONSE GEORGES LAMBERT.

Witnesses:
 ANTOINE LAVOIX,
 HANSON C. COXE.